United States Patent
Sanematsu et al.

[11] Patent Number: 5,368,530
[45] Date of Patent: Nov. 29, 1994

[54] APPARATUS FOR CONTROLLING CHANGE RATIO OF STEPLESS TRANSMISSION

[75] Inventors: Hiroaki Sanematsu, Hiroshima; Tatsumi Hagihara, Higashi-Hiroshima, both of Japan

[73] Assignee: Mazda Motor Corporation, Hiroshima, Japan

[21] Appl. No.: 174,176

[22] Filed: Dec. 29, 1993

Related U.S. Application Data

[63] Continuation of Ser. No. 627,812, Dec. 14, 1990, abandoned.

[30] Foreign Application Priority Data

Dec. 18, 1989 [JP] Japan .................................. 1-329345

[51] Int. Cl.⁵ .............................................. F16H 61/02
[52] U.S. Cl. .......................................... 477/43; 477/48
[58] Field of Search .............................. 477/48, 49, 43

[56] References Cited

U.S. PATENT DOCUMENTS

| | | | |
|---|---|---|---|
| 4,107,776 | 8/1978 | Beale | 74/866 X |
| 4,458,560 | 7/1984 | Frank et al. | 74/866 X |
| 4,459,878 | 7/1984 | Frank | 74/866 X |
| 4,597,308 | 7/1986 | Tanaka et al. | 74/866 |
| 4,653,006 | 3/1987 | Osanai et al. | 74/866 X |
| 4,686,871 | 8/1987 | Kobayashi | 74/867 X |
| 4,698,764 | 10/1987 | Inagaki et al. | 74/866 X |
| 4,700,590 | 10/1987 | Omitsu | 74/866 X |
| 4,713,987 | 12/1987 | Matsumura | 74/866 |
| 4,735,114 | 4/1988 | Satoh et al. | 74/866 |
| 4,767,382 | 8/1988 | Tezuka et al. | 474/28 |
| 4,867,732 | 9/1989 | Soga et al. | 474/28 |
| 4,989,149 | 1/1991 | Mimura et al. | 364/424.1 X |
| 4,995,283 | 2/1991 | Sawasaki et al. | 74/866 |
| 5,011,458 | 4/1991 | Kumm | 74/866 X |

*Primary Examiner*—Dirk Wright

[57] ABSTRACT

A change ratio control apparatus is arranged to set the lower limit of the change ratio to values included in a range in which transmission efficiency does not deteriorate due to the reduction in the change ratio if the transmission efficiency of the driving force in the transmission deteriorates in a low load region in which the change ratio is low. Therefore, deterioration in the transmission efficiency can be prevented and the fuel consumption rate can thereby be improved.

5 Claims, 9 Drawing Sheets

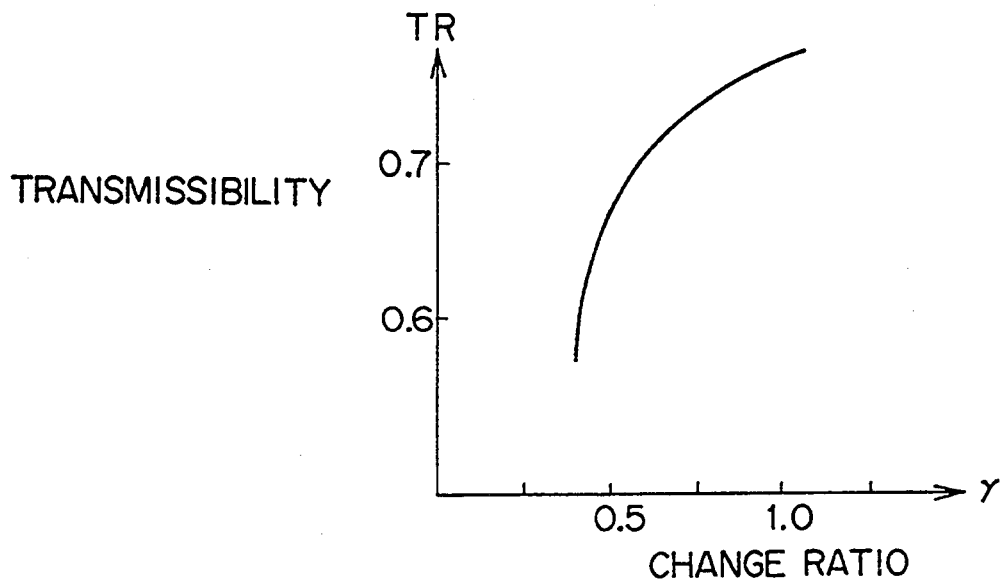
F I G. 1
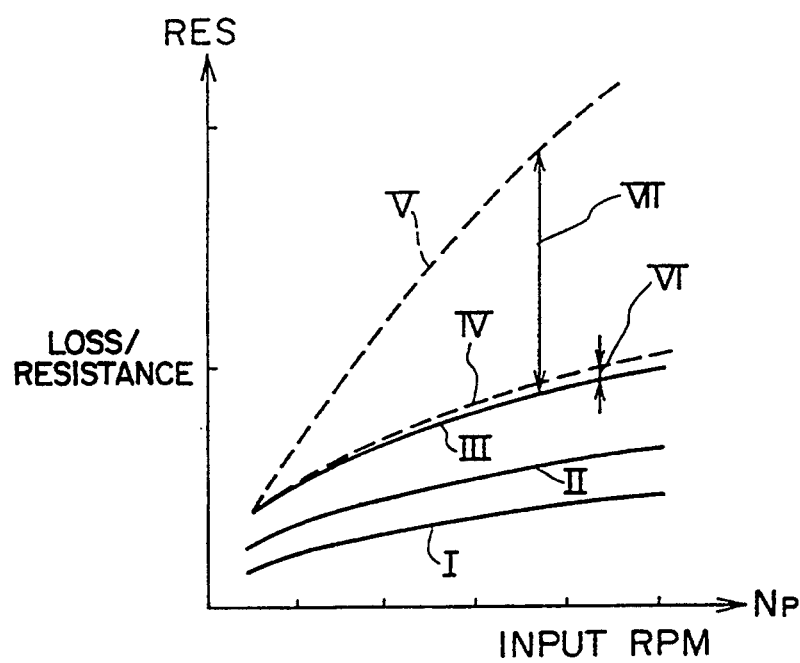
F I G. 2

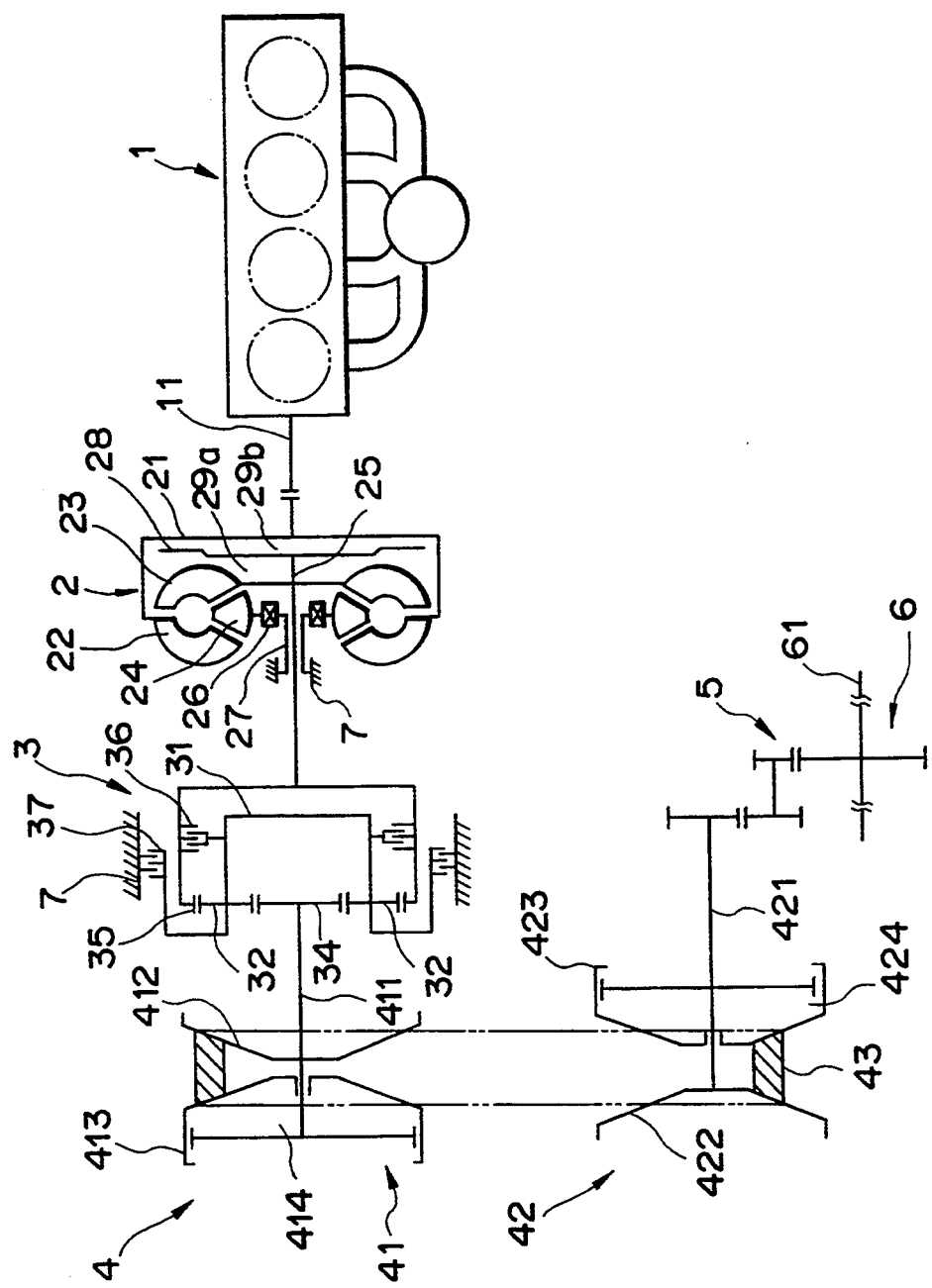

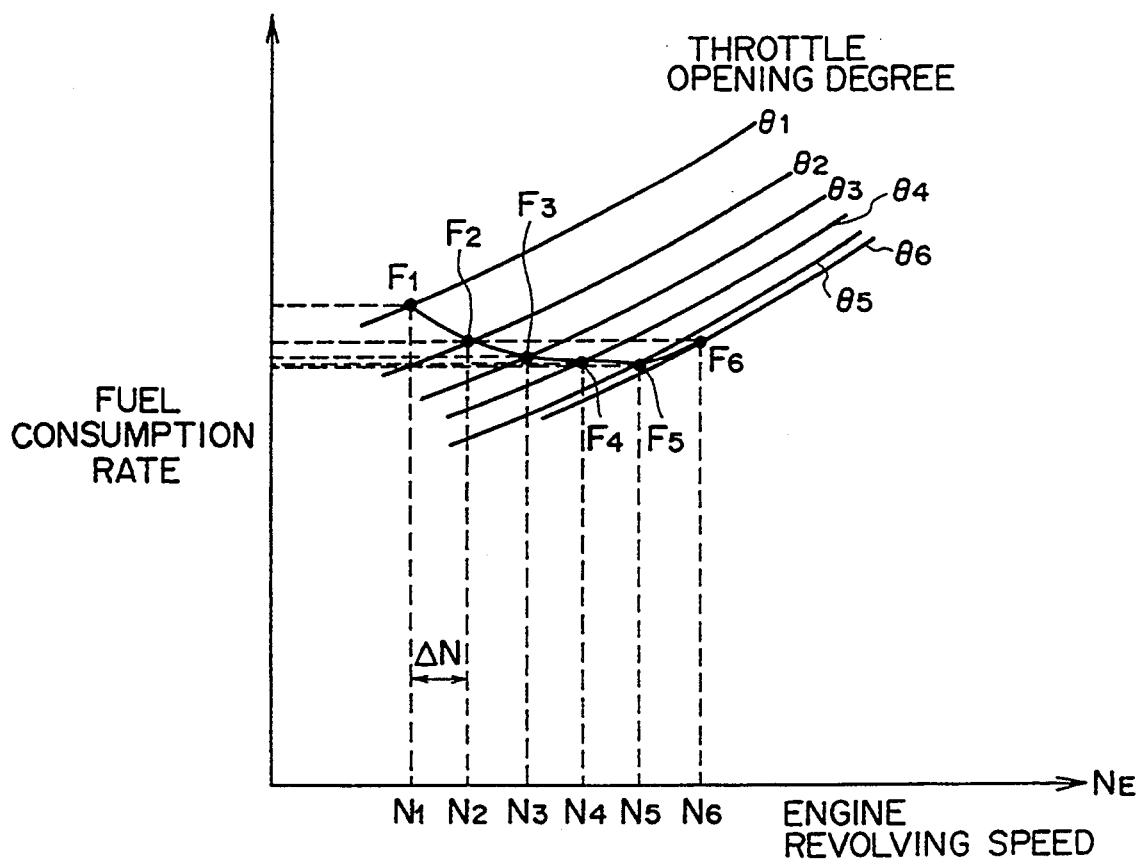
F I G. 10

APPARATUS FOR CONTROLLING CHANGE RATIO OF STEPLESS TRANSMISSION

This application is a continuation of application Ser. No. 07/627,812, filed Dec. 14, 1990, now abandoned.

BACKGROUND OF THE INVENTION

The present invention relates to an apparatus for controlling the change ratio of a stepless transmission with belt drive system, and, more particularly, to an apparatus which improves fuel consumption efficiency by employing the stepless transmission in, for example, a vehicle.

As a so-called stepless transmission capable of adjusting the change ratio (to be designated by symbol "$\gamma$" hereinafter) in a stepless and variable manner, a structure has been disclosed, for example, in Japanese Patent Laid-Open No. 63-42146. A stepless transmission of the type described therein comprises a transmission including a drive pulley (to be called a "primary pulley" hereinafter) the effective radius of which can be varied, a follower pulley (to be called a "secondary pulley" hereinafter), and a belt arranged between the previously described two pulleys. Thus, the effective radii of the primary pulley and the secondary pulley are continuously adjusted by applying/discharging hydraulic pressure to the hydraulic cylinder of the drive pulley. When a stepless transmission of the type described above is applied to a vehicle, the primary pulley is connected to the engine side (usually it is connected to the forward-/reverse switch mechanism) so that the engine output is transmitted through the secondary pulley. Furthermore, the change ratio of the stepless transmission is, for example, defined to be the ratio of the rotational speed of the secondary pulley with respect to the engine speed.

In a conventional transmission which employs a multi-step gear, the change ratio $\gamma$ is varied in a stepped manner. However, in a stepless transmission, the change ratio is varied continuously. Theoretically, if the engine speed $N_E$ is to be a constant speed, the vehicle speed V is continuously changed by simply continuously changing the change ratio $\gamma$. If a driver operates the acceleration pedal to raise the vehicle speed, the vehicle speed can be increased by reducing the change ratio $\gamma$ without enlarging the throttle opening degree if there is excess engine torque. If there is no excess engine torque, the desire of a driver can be met by controlling the throttle opening degree. That is, in the case of an electronically controllable throttle, the change ratio and the throttle opening degree are controlled in accordance with the accelerator opening degree and the present vehicle speed V. In the case of a mechanical throttle in which the accelerator operation directly corresponds to the throttle opening degree, the change ratio is the subject to be controlled for the purpose of the desired vehicle speed.

The continuous variation of the change ratio $\gamma$ of the stepless transmission involves an upper limit (to be called an "upper limit change ratio") and a lower limit (to be called a "lower limit change ratio") depending upon physical restrictions due to the shape of each of the two pulleys. Therefore, in the stepless transmission, the change ratio is varied between the previously described upper limit change ratio $\gamma_{max}$ and the lower limit change ratio $\gamma_{min}$, which have been stationarily determined in accordance with the mechanical structure of the pulleys. The reason for the existence of the limits of the change ratio lies in physical limitations in the size of the pulleys.

Therefore, the stepless transmission for a vehicle must be arranged in a manner such that the control for realizing a desired vehicle speed is performed such that the corresponding change ratio does not exceed the previously described upper limit change ratio or lower limit change ratio, as well as the previously described control of the change ratio.

For example, a normal operation control is performed in a manner such that the change ratio is continuously controlled, and the throttle opening degree is controlled as well if the change ratio exceeds the previously described two limits so that the constant vehicle speed is maintained.

In a mode in which the stepless transmission is directly connected to the engine of a vehicle, it is preferable that the change ratio be restricted to a low level so that engine speed can be maintained at low speed, and the fuel consumption efficiency can thereby be improved. Therefore, the lower the change ratio is, the more fuel consumption efficiency is improved.

However, the inventors of the present invention have discovered the fact that the fuel consumption efficiency of an actual vehicle cannot be improved by simply restricting the change ratio to the lowest level.

The problem above will be described with reference to FIGS. 1 and 2. FIG. 1 is a graph which illustrates the relationship between the transmission efficiency with respect to the change ratio $\gamma$ of a stepless transmission. Transmission efficiency means the efficiency of the transmission mechanism with regard to power in to the transmission as compared to the power out of the transmission. FIG. 2 is a graph which illustrates the losses and change in various resistances (hereinafter collectively identified as "RES") at each portion of a stepless transmission with respect to the revolution speed $N_P$ (that is, the input revolution speed of the transmission) of the primary pulley.

As shown in FIG. 1, the transmission efficiency TR of the transmission mechanism of a stepless transmission is varied in accordance with the change ratio $\gamma$. Specifically, the transmission efficiency TR is reduced in proportion to the chance ratio $\gamma$. FIG. 2 illustrates the reason why the transmission efficiency deteriorates as shown in FIG. 1. Referring to FIG. 2, line I designates the power loss of the oil pump, line II designates the dragging resistance of the clutch, line III designates the resistance generated due to the revolution of the primary pulley, line IV designates the overall resistance at the maximum change ratio, and line V designates the overall resistance at the lower limit change ratio. Therefore, symbol VI designates the quantity of the increase of the line IV with respect to the line III, VII designates the quantity of the increase of the line V with respect to the line III, that is, the increase in the resistance at the primary shaft at the lower limit change ratio is shown in FIG. 2. As is shown from a comparison made between lines IV and V, the rotational resistance of the power transmission system in front of the secondary pulley varies in inverse proportion to the change ratio. That is, the rotational resistance increases in inverse proportion to the change ratio. The lower the change ratio becomes, the larger the resistance at the primary shaft. As a result, the overall rotational resistance of the power transmission system increases. Therefore, the lower the change ratio becomes, the more the transmission efficiency deteriorates, as is shown in FIG. 1.

When the change ratio is set to a value which approximates the minimum (lower limit change ratio) value in a low load region, a problem arises in that the fuel consumption efficiency deteriorates due to deterioration in the transmission efficiency of the transmission. However, a balance point exists at which the reduction in the fuel consumption efficiency due to the restriction of engine speed and the decrease in the fuel efficiency due to increased resistance caused by a reduction in the change ratio are able to balance each other. Therefore, control must be performed in a manner such that the change ratio does not exceed the previously described balance point for the purpose of improving fuel consumption efficiency.

SUMMARY OF THE INVENTION

Accordingly, an object of the present invention is to provide a change ratio control apparatus capable of improving fuel consumption efficiency through high transmission efficiency in a transmission mechanism made possible by maintaining the change ratio at a relatively high degree.

Another object of the present invention is to provide a change ratio control apparatus capable of setting the minimum change ratio in a real time manner by theoretically calculating the minimum change ratio in which the fuel consumption ratio is low for each vehicle speed.

When the change ratio of the transmission mechanism is reduced, the rotational resistance of the secondary pulley on the shaft of the primary pulley increases in inverse proportion to the change ratio. Accordingly, the overall rotational resistance of the transmission mechanism increases, causing the transmission efficiency to deteriorate. A fear arises that the deterioration in transmission efficiency will influence fuel consumption efficiency. However, according to the present invention, if the transmission efficiency of the transmission mechanism deteriorates below a predetermined value because of a reduction in the change ratio, the minimum change ratio, which defines the lowest possible change ratio, is corrected to a larger value. The actual change ratio of the transmission mechanism is then restricted by the corrected minimum change ratio. As a result, the overall rotational resistance of the transmission mechanism cannot increase excessively, in comparison to a conventional case in which the change ratio can be varied to the lower limit reduction ratio. As a result, extreme deterioration in the transmission efficiency of the transmission can be prevented satisfactorily. Consequently, the fuel consumption efficiency can be improved.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such an example, however, is not exhausive of the various embodiments of the invention, and therefore reference is made to the claims which follow the description for determining the scope of the invention.

BRIEF DESCRIPTION OF THE DRAWINGS

FIG. 1 is a graph which illustrates the relationship between the change ratio and the transmission efficiency of a stepless transmission according to conventional art and an embodiment of the present invention;

FIG. 2 is a graph which illustrates the change in the loss and resistance ("RES") in the stepless transmissions according to the conventional art and the embodiment of the present invention when the input revolution has been changed;

FIG. 3 is an overall structural view which illustrates the stepless transmission according to this embodiment;

Figure 6:
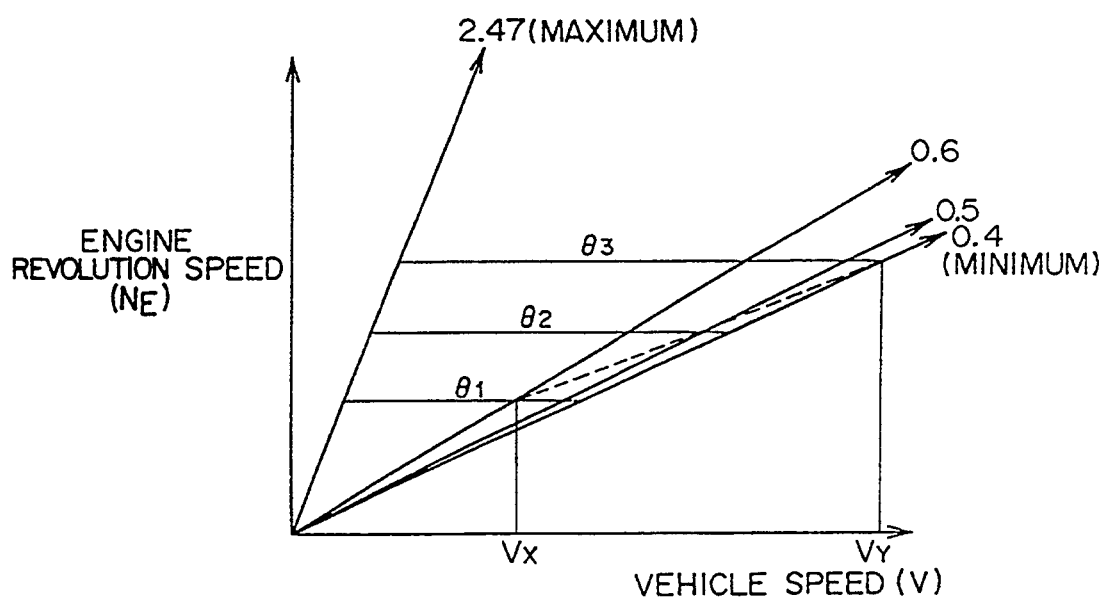
Figure 9:
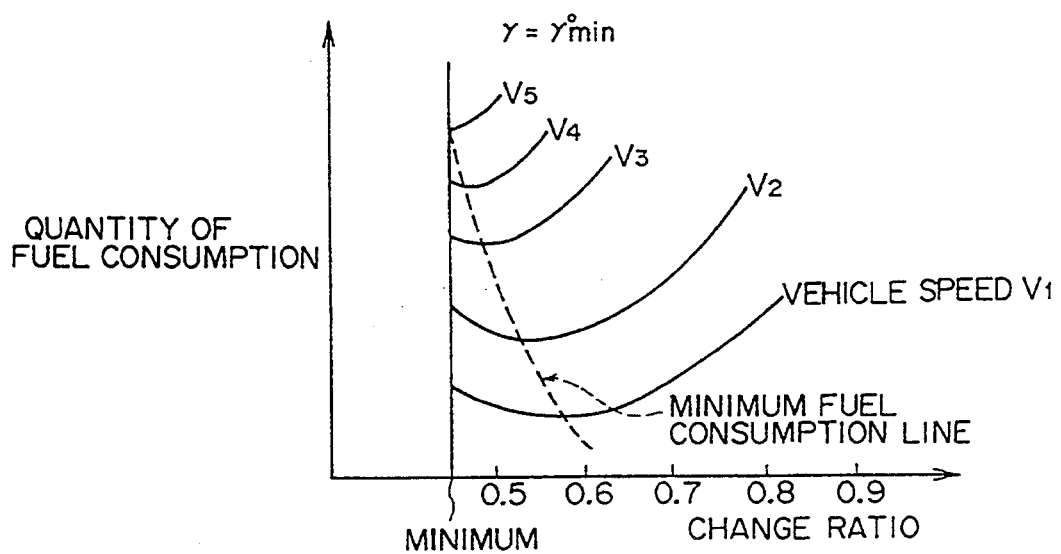
Figure 7:
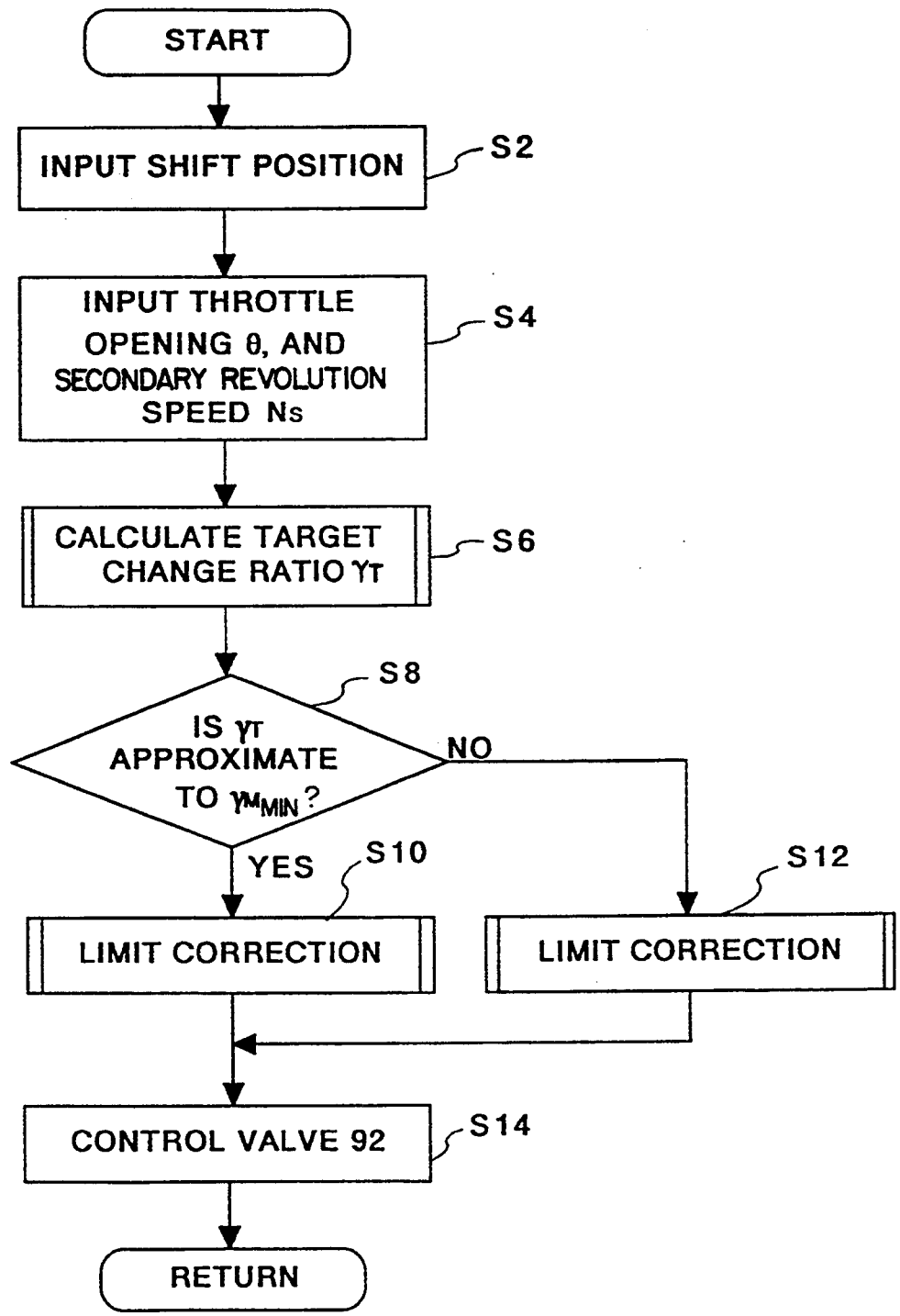
Figure 8:
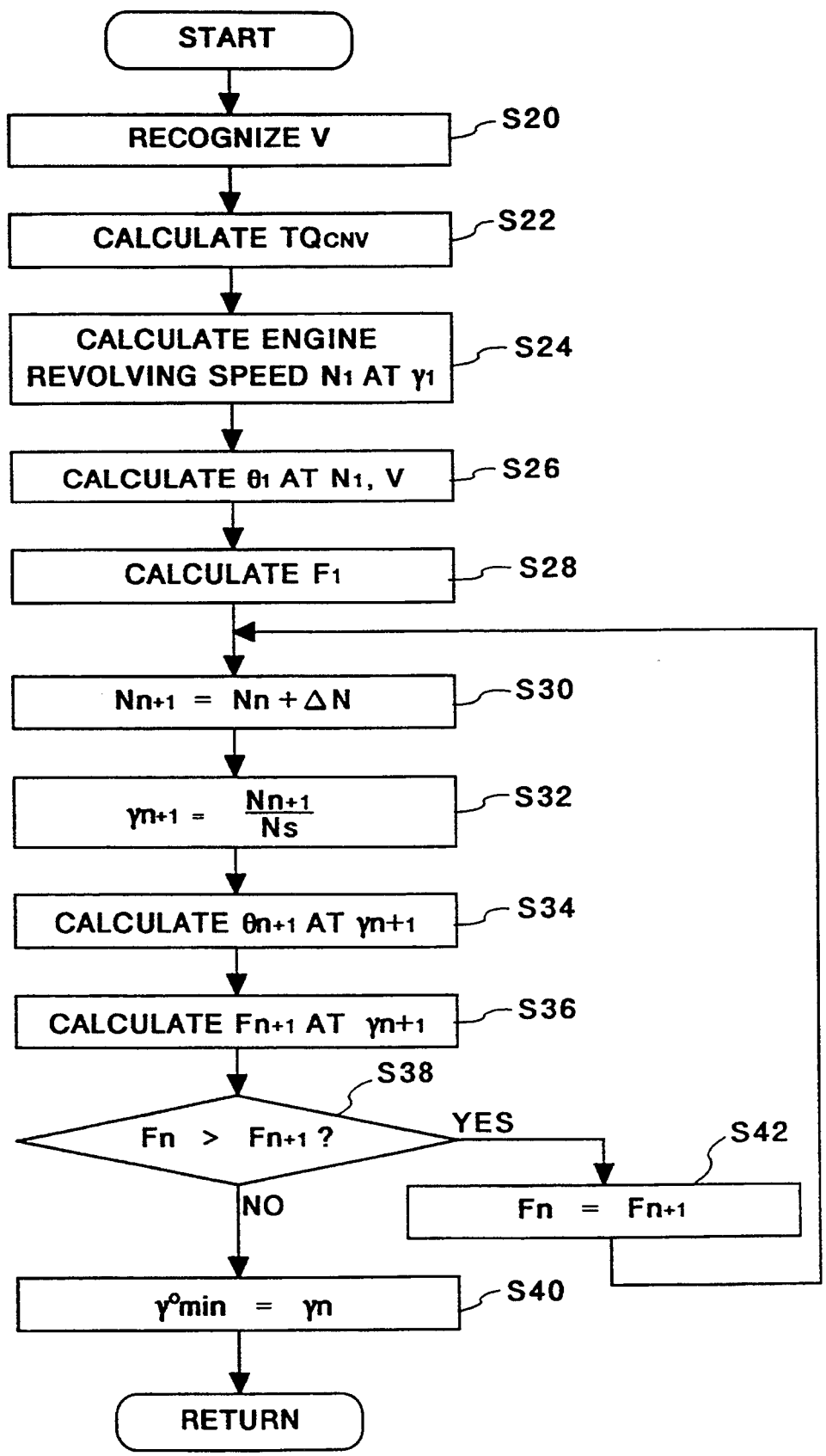

FIG, 5 is a block diagram for an electric control system for a control apparatus according to this embodiment;

FIG. 6 is a graph which illustrates the characteristics of a transmission map according to this embodiment;

FIG. 7 is a flow chart which illustrates the control procedure for controlling the normal change ratio to which the minimum change ratio which has been obtained by calculation;

FIG. 8 is a flow chart which illustrates the control procedure for correcting the minimum change ratio according to this embodiment;

FIG. 9 is a graph which illustrates the fuel consumption characteristics with respect to the change ratio at a constant vehicle speed; and FIG. 10 is a graph which illustrates the characteristics of the fuel consumption rate with respect to the engine speed.

PREFERRED EMBODIMENT OF THE INVENTION

A preferred embodiment of the present invention in which the present invention is applied to a transmission will be described with reference to the drawings. According to the present invention, a case will be considered in which the change ratio is lowered and the transmission efficiency, which is the efficiency of transmitting the engine power to the elements in the transmission, is thereby lowered. According to this embodiment, the transmission efficiency of the driving power is estimated in accordance with the change ratio.

Structure of Stepless Transmission

FIG. 3 illustrates the overall structure of a stepless transmission which is the subject to be controlled by a control apparatus according to this embodiment. Referring to FIG. 3, the stepless transmission comprises a torque converter 2 connected to an output shaft 11 of an engine 1, a forward/reverse switch mechanism 3, a stepless transmission mechanism 4, a reduction mechanism 5 and a differential mechanism 6.

The previously described torque converter 2 comprises a pump cover 21 connected to the engine output shaft 11 and a pump impeller 22 secured to one side portion of the pump cover 21 so that it is integrally rotated with the engine output shaft 11. Furthermore, the torque converter 2 comprises a turbine runner 23 rotatably disposed on the inside of the pump cover 21 in a manner such is disposed facing the pump impeller 22, a stator 24 disposed between the turbine runner 23 and the pump impeller 22 so as to enlarge the torque, and a turbine shaft 25 secured to the turbine runner 23. The stator 24 is connected to a transmission case 7 via a one-way clutch 26 and a stator shaft 27. A lockup piston 28 secured to the turbine shaft 25 in a manner such that it is able to slide as desired is disposed between the turbine runner 23 and the pump cover 21. When hydraulic pressure is introduced/discharged from a lockup locking chamber 29a and a lockup unlocking chamber 29b formed on the two sides of the lockup piston 28, the lockup piston 28 and the pump cover 21 are fastened/released from each other.

The previously described forward/reverse switch mechanism 3 is arranged to be a single pinion type mechanism for the purpose of reducing the overall size of the apparatus. That is, the forward/reverse switch mechanism 3 of the single pinion type comprises a carrier 31, pinion gears 32 supported by the carrier 31, a sun gear 34, which is, in a spline manner, connected to primary shaft 411 of a stepless transmission mechanism 4, to be described later, so that the sun gear 34 engages with pinion gear 32 and a ring gear 35, which is arranged to engage with the pinion gear 32. The ring gear 35 is, in a spline manner, connected to the turbine shaft 25 of the torque converter 2. Furthermore, a forward clutch 36 is disposed between the ring gear 35 and the carrier 31 so as to connect/release the ring gear 35 and the carrier 31. In addition, a reverse brake 37 is disposed between the carrier 31 and a transmission case 7 so as to selectively secure the carrier 31 to the transmission case 7. As a result, in the case where the vehicle is operated in a forward range mode in which the forward clutch 36 is connected and the reverse brake 37 is released, the ring gear 35 and the carrier 31 are connected to each other so as to be capable of integrally rotating. Furthermore, the rotation of the turbine shaft 25 is, as it is, transmitted to the primary shaft 411 of the stepless transmission mechanism 4 while arranging the gear ratio of the forward/reverse switch mechanism 3 to be "1.0". In the case where the vehicle is operated in a reverse range mode in which the reverse brake 37 is connected and the forward clutch 36 is released, the carrier 31 is secured to the case 7 in a manner such that the carrier 31 cannot be rotated, so that the rotation of the ring gear 35 is, via the pinion gear 32, transmitted to the sun gear 34, and the rotation of the turbine shaft 25 is reversed and transmitted to the primary shaft 411 of the stepless transmission mechanism 4 while arranging the gear ratio to be "0.6". When both the forward clutch 36 and the reverse brake 37 are released, the rotational force of the engine is not transmitted to the primary shaft 411 of the stepless transmission mechanism 4 from the turbine shaft 25 (a neural state and a parking state).

The previously described stepless transmission mechanism 4 comprises a primary pulley 41, a secondary pulley 42, and a V-belt 43 arranged between the previously described two pulleys 41 and 42.

The previously described primary pulley 41 comprises the primary shaft 411 coaxially disposed with the turbine shaft 25, a stationary conical plate 412 secured to the primary shaft 411 and a movable conical plate 413 supported by the primary shaft 411, which is disposed to confront the stationary conical plate 412, in a manner such that the movable conical plate 413 is able to slide as desired. When the movable conical plate 413 is moved, the position at which previously described V-belt 43 is held is changed. As a result, the effective pitch diameter (effective radius) is changed. That is, when the movable conical plate 413 has approached the stationary conical plate 412, the effective pitch diameter is enlarged. When the movable conical plate 413 moves farther from the stationary conical plate 412, the effective Pitch diameter is reduced.

The secondary pulley 42 is basically arranged to be a structure similar to that of the primary pulley 41. That is, the secondary pulley 42 comprises a secondary shaft 421 disposed parallel to the primary shaft 411, a stationary conical plate 422 secured to the secondary shaft 421, and a movable conical plate 423 which is supported in a manner such that the movable conical plate 423 is able to slide as desired. As a result, when the movable conical plate 423 is moved, the effective pitch diameter of the secondary pulley 42 changes.

Hydraulic cylinders 414 and 424, used for sliding corresponding movable conical plates 413 and 423, are disposed on the rear side of the movable conical plates 413 and 423 of the pulleys 41 and 42. Hydraulic cylinder 414 of the primary pulley 41 which receives the pressure is arranged to have about two times the pressure receiving area of hydraulic cylinder 424.

In order to change the change ratio between the two pulleys 41 and 42, hydraulic pressure is applied/discharged by the hydraulic cylinder 414 of the primary pulley 41. In order to always maintain the tension of the V-belt 43 at a proper level, hydraulic pressure is applied/discharged by the hydraulic cylinder 424 of the secondary pulley 42. When the hydraulic pressure is introduced into the hydraulic cylinder 414 of the primary pulley 41, the position at which the V-belt 43 is held at the primary pulley 41 moves outwards. As a result, the effective pitch diameter of the primary pulley 41 is enlarged. In accordance with this, the position at which the V-belt is held at the secondary pulley 42 moves inwards. As a result, the effective pitch diameter of the secondary pulley 42 is reduced. Therefore, the change ratio between the primary shaft 411 and the secondary shaft 421 is reduced (changed such that the speed is raised). On the contrary, when the hydraulic pressure is discharged from the hydraulic cylinder 414, the effective pitch diameter of the primary pulley 41 is reduced. Furthermore, the effective pitch diameter of the secondary pulley 42 increases so that the change ratio between the primary shaft 411 and the secondary shaft 421 increases (changed such that the speed is lowered).

The reduction mechanism 5 and the differential mechanism 6 are arranged with known structures so that the rotation of the secondary shaft 421 is transmitted to a wheel shaft 61.

The change ratio according to this embodiment is defined as follows: assuming that the engine speed of engine 1 is $N_E$ and the revolution of the secondary pulley 42 is $N_S$, the change ratio $\gamma$ is defined as follows:

$$\gamma = \frac{N_E}{N_S} \quad (1)$$

Hydraulic Circuit

Next, referring to FIGS. 4 and 4B, a hydraulic circuit of the previously described stepless transmission for controlling the operation of the lockup piston 28 of the torque converter 2, the forward clutch 6 and the reverse brake 37 of the forward/reverse switch mechanism 3, and the primary pulley 41 and the secondary pulley 42 of the stepless transmission mechanism 4 will be described.

Figure 4A:
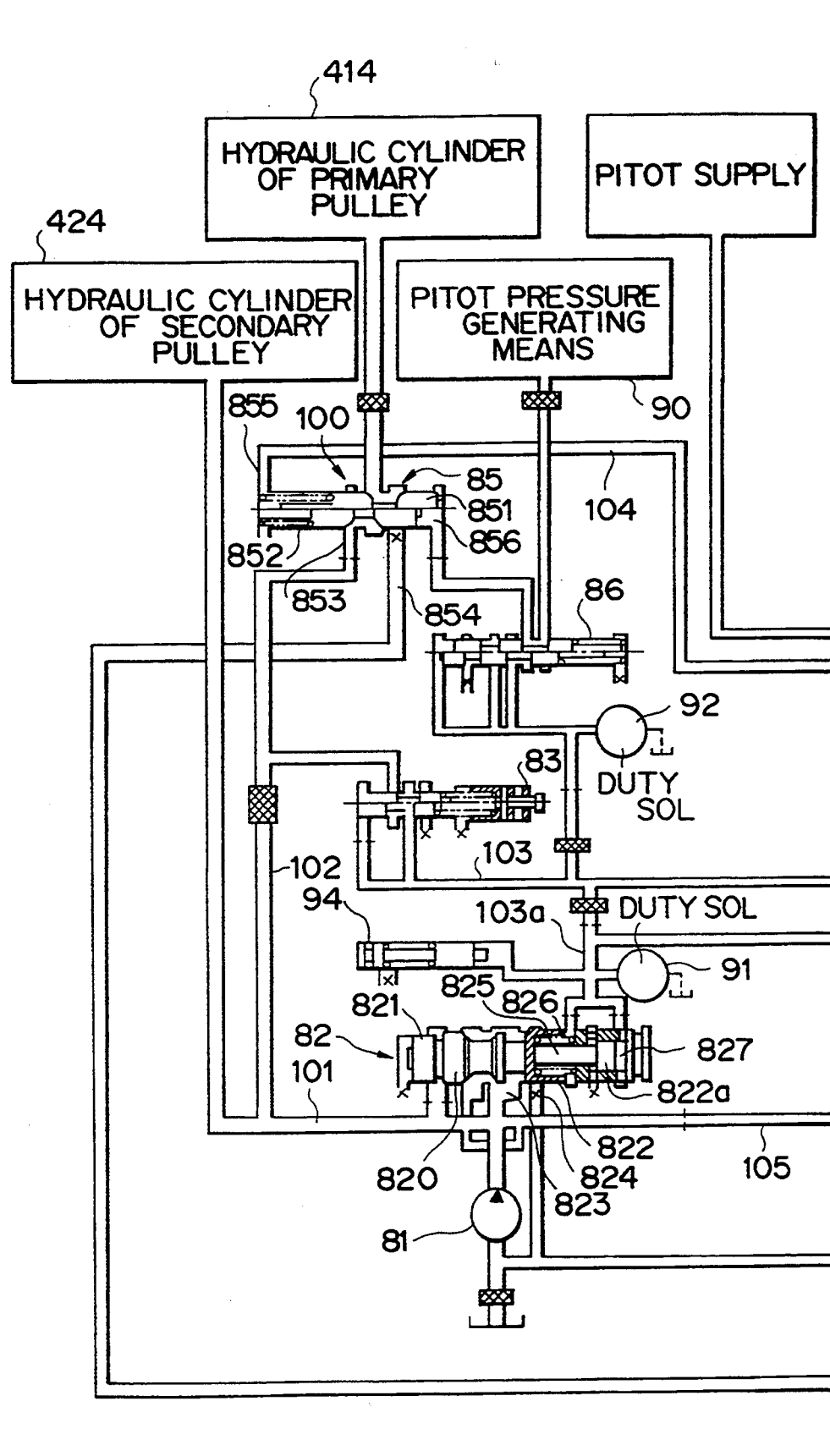
FIGS. 4A and 4B illustrate a hydraulic control circuit for the stepless transmission shown in FIG. 3.
Figure 4B:
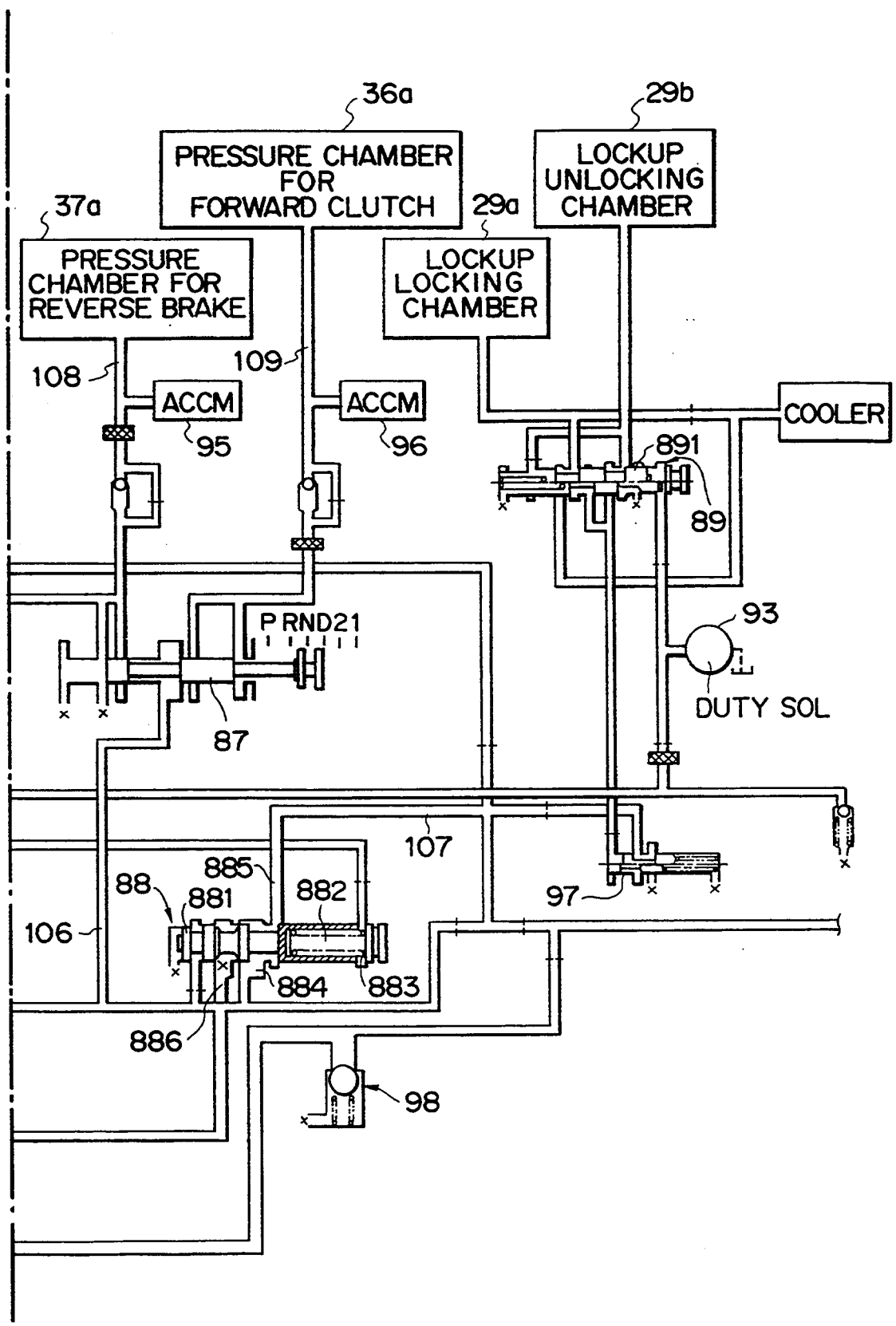

Referring to FIGS. 4 and 4B, the hydraulic circuit comprises an oil pump 81 operated by engine 1. The hydraulic operating fluid discharged from oil pump 81 is first adjusted by a line pressure adjustment valve 82 to a predetermined line pressure. Then it is supplied to the hydraulic cylinder 424 of the secondary pulley 42 via line 101. It is finally supplied to hydraulic cylinder 414 of the primary pulley 41 via line 102, which branches from line 101.

The previously described line pressure adjustment valve 82 comprises a spool 820 composed of a main spool 821 and a sub-spool 822 disposed in series. The main spool 821 and the sub-spool 822 constituting the spool 820 are connected to each other in a manner such that an end portion of the sub-spool 822 is positioned in contact with an end portion of the main spool 821. Another end portion of the sub-spool 822 has a large-diameter portion 822a, the cross sectional area of which is larger than the area of contact (the cross sectional area of the junction) with the main spool 821. A pressure governing port 823, to which discharge oil from oil pump 81 is introduced, and a drain port 824 which communicates with the suction side of the oil pump 81 are disposed at positions which correspond to the central portion of the main spool 821. When the main spool 821 is moved to the left as viewed in the drawing, the connection established between the pressure governing port 823 and the drain port 824 is cancelled. When the main spool 821 is moved to the right as viewed in the drawing, a connection between the pressure governing port 823 and the drain port 824 is established. Furthermore, a first pilot chamber 825 is formed at a position which corresponds to the portion in which the main spool 821 and the sub-spool 822 are connected to each other. The first pilot chamber 825 accommodates a spring 826 which urges the main spool 821 to the left portion in the drawing. In addition, the large-diameter portion 822a of the sub-spool 822 has a second pilot chamber 827 which communicates with the first pilot chamber 825. The hydraulic operating fluid, the pressure of which has been lowered to a predetermined level by reducing valve 83 while it passes through line 103, is introduced into the first pilot chamber 825 and the second pilot chamber 827 as pilot pressure which has been adjusted by a first duty solenoid valve 91 while it passes through a pilot passage 103a. The pilot pressure acts in the same direction as that of the urging force of the previously described spring 826, while the hydraulic pressure in the line 101 acts on the other end portion of the main spool 821 in a manner such that it acts against the previously described urging force and the pilot pressure. As a result of the relationship between the forces, the spool 820 is moved so that the pressure governing port 823 and the drain port 824 are connected or disconnected with each other. Therefore, the line pressure is controlled to a level which corresponds to the pilot pressure which is governed by the first duty solenoid valve 91.

A change ratio control valve 85 is provided in the previously described line 102. The change ratio control valve 85 comprises a spool 851, a spring 852 which urges the spool 851 to the right when viewed in the drawing, a line pressure port connected to the upper stream portion of line 102, a drain port 854, a reverse port 855 open at the portion in which the spring 852 is positioned and which is connected to a shift valve 87 via a line 104, and a pilot chamber 856 formed in a portion opposite to the portion in which the spring 852 is disposed and to which the pilot pressure is introduced.

The pilot chamber 856 of the change ratio control valve 85 is connected to a second duty solenoid valve 92 via a pitot valve 86 and to a pitot pressure generating means 90 which generates the pitot pressure which corresponds to the engine speed of the engine 1. Therefore, either the pitot pressure generated by the pilot pressure generating means 90 or the pressure adjusted by the second duty solenoid valve 92 can be selectively introduced, as the pilot pressure, into the pilot chamber 856 by the pitot valve 86. As a result, even if the second duty solenoid valve 92 fails, the pitot pressure can be, as the pilot pressure, introduced from the pitot pressure generating means 90 into the pilot chamber 856.

In the change ratio control valve 85, the hydraulic pressure from the reverse port 855 is drained via the shift valve 87 when the vehicle is operated forwards (when the shift valve 87 is positioned at any of the shift positions "D", "2" or "1"). Spool 851 is moved due to the relationship between the pilot pressure to be introduced into the pilot chamber 856 and the urging force of the spring 852. As a result, either of a line pressure port 853 and the drain port 854 is selectively in communication with the hydraulic cylinder 414 of the primary pulley 41.

Thus, in the stepless transmission apparatus according to the present invention, the supply/discharge of the hydraulic pressure from the hydraulic pressure cylinder 414 of the primary pulley 41 is controlled in accordance with the pilot pressure to be introduced into the pilot chamber 856. Therefore, the change ratio between the primary pulley 41 and the secondary pulley 42 of the stepless transmission mechanism 4 are variably adjusted.

In the reverse mode (when the shift valve 87 is positioned at the shift position R), the hydraulic pressure (the hydraulic operating fluid to be described later) is introduced from the reverse port 855. As a result, spool 851 is secured while being abutted against the right side in the drawing by the previously described hydraulic operating fluid. Therefore, in the reverse mode, the hydraulic cylinder 414 of the primary pulley 41 and the drain port 854 always communicate with each other. As a result, the change ratio is fixed to the maximum change ratio.

In the neutral or parking mode (when the shift valve 87 is positioned at either the shift positions N and P) in which the engine power is not transmitted to the wheel shaft 61 by the forward/reverse switch mechanism 3, the same state as that in the reverse mode is realized.

The hydraulic operating fluid, which is governed by the line pressure adjustment valve 82 described above, is transmitted to line 105 as well as to line 101. The hydraulic operating fluid thus transmitted to the line 105 is adjusted to a predetermined operating pressure by an operating pressure adjustment valve 88 before it is supplied to lines 106 and 107.

The operating pressure adjustment valve 88 comprises a spool 881, a pilot chamber 882 formed in an end portion of the spool 881, a spring 883 disposed in the pilot chamber 882, a first governing port 884 connected to line 105, a second governing port 885 connected to the line 107 and a drain port 886. The pilot chamber 882 is connected to first duty solenoid valve 91 via the pilot passage 103a. Therefore, the hydraulic operating fluid, which is governed by the first duty solenoid valve 91, is introduced into the pilot chamber 882 as the pilot pressure. The pilot pressure acts in the same direction as the direction in which the urging force of the previously described spring 883 acts. Simultaneously, the hydraulic pressure in line 105 acts on the other end portion of the spool 881 so as to act against the previously described urging force and the pilot pressure. As a result of the relationship of the previously described forces, the spool 881 is moved so that the first and the second governing ports 884 and 885 and the drain port 886 are connected/disconnected. Therefore, the pressure for operating the forward clutch 36 and the reverse brake 37 is controlled to the level which corresponds to the pilot pressure controlled by the first duty solenoid valve 91.

The hydraulic operating fluid supplied to the previously described line 106 is supplied to a hydraulic pressure chamber 36a of the forward clutch 36 of the forward/reverse switch mechanism 3 via line 109 when the shift valve is positioned at the shift positions D, 2 or 1. When the shift valve 87 is positioned at the shift position R, the hydraulic operating fluid is supplied to a hydraulic pressure chamber 37a of the reverse brake 37 of the forward/reverse switch mechanism 3 via a line 108. It is also supplied to the reverse port 855 of the change ratio control valve 85 via the line 104. On the other hand, the hydraulic operating fluid in each of the hydraulic pressure chambers 36a and 37a of the forward clutch 36 and the reverse brake 37 of the forward/reverse switch mechanism 3 is arranged to be discharged through lines 108 and 109 when the shift valve 87 is positioned at any of the shift positions R, N and P. Therefore, the forward clutch 36 and the reverse brake 37 of the forward-/reverse switch mechanism 3 are connected/released in accordance with the shift position of the shift valve 87. Furthermore, the change ratio of the stepless transmission mechanism 4 is, as described above, fixed to the maximum change ratio at any of the shift positions R, N or P.

The hydraulic operating fluid supplied to the previously described line 107 is supplied to the lockup locking chamber 29a or the lockup unlocking chamber 29b of the torque converter 2 via a lockup control valve 89. The lockup control valve 89 is arranged in a manner such that the operation of its spool 891 is controlled by the pilot pressure governed by a third duty solenoid valve 93. When the previously described control pressure is lowered, the spool 891 is moved to the right portion in the drawing. As a result, the hydraulic operating fluid is supplied to the lockup locking chamber 29a from line 107. Furthermore, the hydraulic operating fluid in the lockup unlocking chamber 29b is drained. When the previously described pilot pressure is raised, spool 891 is moved to the left portion in the drawing. As a result, the hydraulic operating fluid is supplied to the lockup unlocking chamber 29b from line 107. Furthermore, the hydraulic operating fluid in the lockup locking chamber 29a is drained.

Reference numeral 94 represents an accumulator valve which acts to prevent pulsation of the pilot pressure of the pilot passage 103a when the first duty solenoid valve 91 is turned on/off. Reference numerals 95 and 96 represent accumulators for absorbing the shock generated when the forward clutch 36 and the reverse brake 37 are connected. Reference numeral 97 represents a relief valve. Reference numeral 98 represents a pressure retaining valve which acts such that the total quantity of oil in the hydraulic cylinder 414 is not discharged, but a portion of it at a predetermined low pressure which does not generate an abutting force is retained when the oil is drained. As a result, a desired responsibility in the ensuing transmission operation, in which the change ratio is raised, is secured.

Figure 5:
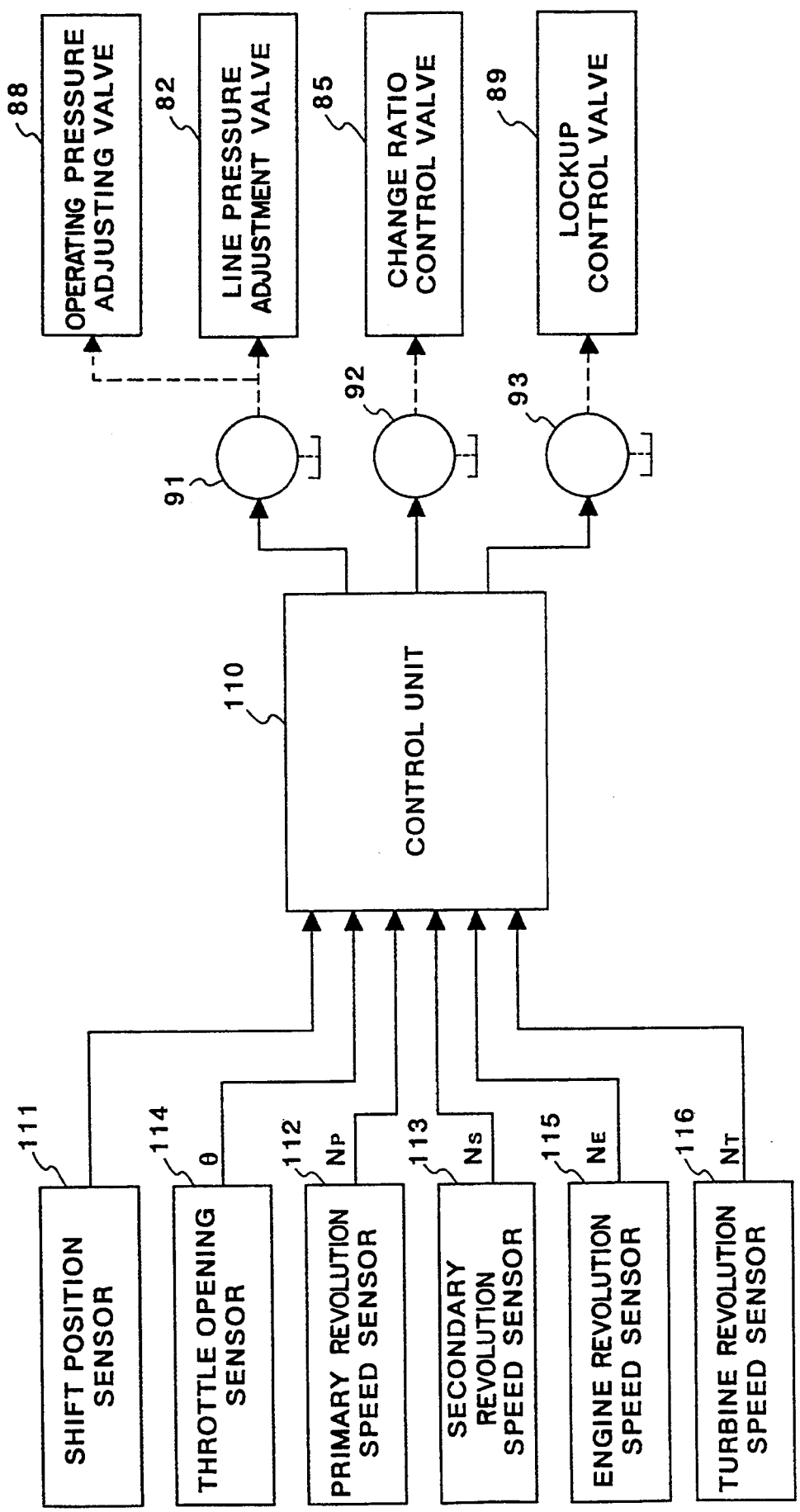

FIG. 5 illustrates an electric control circuit for the previously described stepless transmission. Referring to the drawing FIG. 5, a control unit 110 including a microcomputer and the like is arranged to receive a shift position signal supplied from a shift position sensor 111 for detecting shift positions (D, 1, 2, R, N and P) selected by a driver by operating a selection lever (omitted from illustration). Furthermore, the control unit 110 receives a primary pulley revolution signal $N_P$ supplied from a primary revolution sensor 112 which detects the revolution of the primary shaft 411. Control unit 110 also receives a secondary pulley revolution signal $N_s$ supplied from a secondary revolution sensor 113 which detects the revolution of the secondary shaft 421. The control unit 110 further receives a throttle valve opening degree signal $\theta$ supplied from a throttle opening degree sensor 114 which detects the opening degree of the throttle valve of engine 1. The control unit 110 further receives an engine speed signal $N_E$ supplied from an engine speed sensor 115 which detects the engine speed of the engine 1. The control unit 110 further receives a turbine revolution signal $N_T$ supplied from a turbine revolution sensor 116 which detects the revolution of the turbine shaft 25 of the torque converter 2.

The control unit 110 described above controls duty solenoid valves 91, 92 and 93 in response to the previously described supplied signals. That is, as a result of the operation to control the duty of each of the solenoid valves, the pilot pressure to be introduced to each of the following elements is adjusted: the line pressure adjustment valve 82, the operating pressure adjustment valve 88, the change ratio control valve 85 and the lockup control valve 89.

Control of Change Ratio

The second duty solenoid valve 92 for the change ratio control valve 85 is controlled in accordance with a map shown in FIG. 6, which is arranged in a manner such that the axis of abscissa stands for vehicle speed V (substantially, the secondary revolution $N_S$) and the axis of ordinate stands for engine revolution $N_E$. In accordance with this map, the change ratio is made to be the aiming value between the predetermined "lower limit change ratio $\gamma^M \text{min}$" (=0.447) and the "upper limit change ratio $\gamma^M \text{max}$" (=2.47) in accordance with vehicle speed V and throttle valve opening degree $\theta$. FIG. 7 is a flow chart for use when usual change ratio control is performed. In step S2, shown in FIG. 7, the change speed range is input. In step S4, the throttle opening degree $\theta$ and the secondary pulley revolution $N_s$ are input so that the vehicle speed V is recognized from $N_s$ thus inputted. In step S6, the desired change ratio $\gamma_T$ is calculated in accordance with the vehicle speed V and the throttle opening degree $\theta$. In step S8, it is determined whether or not the thus calculated change ratio $\gamma_T$ approximates the lower limit change ratio $\gamma^M \text{min}$.

If it determined that the change ratio $\theta^T$ does not approximate the lower limit change ratio $\gamma^M \text{min}$, the flow advances to step S12 in which a limit process, where the aiming value $\gamma_T$ is included in a limit range (between $\gamma^M \text{min}$ and $\gamma^M \text{max}$) if the aiming if $\gamma_T$ is not included in the previously described range. If it has been determined that the aiming value $\gamma_T$ approximates the lower limit change ratio $\gamma^M \text{min}$, the flow advances to step S10, in which the aiming value $\gamma_T$ is included in another limit range between new lower limit change ratio $\gamma^O\text{min}$, which has been calculated in accordance with a control procedure shown in FIG. 8, and the upper limit change ratio $\gamma^M\text{max}$. In step S14, the duty of the second duty solenoid valve 92 for the change ratio control valve 85 is controlled in accordance with the previously described change ratio.

Prior to describing the procedure of control performed in accordance with a flow chart shown in FIG. 8 in which $\gamma^O\text{min}$ for use in the limit correction in step S10 is shown, the principle of determining the lower limit change ratio $\gamma^O\text{min}$ will be described with reference to FIGS. 9 and 10.

The lower limit change ratio $\gamma^O\text{min}$ is the change ratio which enables the minimum fuel consumption to be realized while maintaining the present vehicle speed. FIG. 9 illustrates the result of an operation in which the fuel consumption quantities are plotted while varying the change ratio with respect to vehicle speeds $V_1$ to $V_5$. The five curves shown in FIG. 9 are in the form of V-shapes and a minimum fuel consumption line designated by a dashed line as shown in FIG. 9 is obtained by connecting the bottoms (minimum fuel consumption points) of the these curves. Therefore, the previously described minimum fuel consumption line is set to the lower limit change ratio $\gamma^O\text{min}$. In a case where a control is performed in a manner such that the change ratio is reduced in proportion to the degree of coming closer to the $\gamma^M\text{min}$ (=0.447) shown in FIG. 7 at each of the vehicle speeds $V_1$ to $V_5$, the lower limit value of the change ratio is set to a point which is larger than the lower limit change ratio $\gamma^M\text{min}$ (=0.447) and which is positioned on the previously described minimum fuel consumption line.

The fact that the minimum change ratio $\gamma^O\text{min}$ is determined means that the minimum fuel consumption line is also determined. FIG. 10 is a graph which illustrates a procedure for determining the minimum fuel consumption line, where fuel consumption ratio F is shown which is necessary to theoretically obtain the engine speed $N_E$ while making the throttle valve opening degree $\theta$ to be a parameter (as well as while making $\theta$ constant) in a state where the vehicle speed is set to a constant speed. The engine speed $N_E$ is raised when the change ratio is raised, and the fuel consumption rate F is raised in accordance with a rise in engine speed $N_E$.

Referring to FIG. 10, engine speed $N_1$ is the engine speed of engine 1 which is necessary to realize vehicle speed V in the case where the change ratio is set to the lower limit change ratio $\gamma^M\text{min}$ (=$\gamma_1$). Since the change ratio $\gamma$ (wherein the change ratio is assumed to exist at the lower limit change ratio $\gamma_1$) and transmission efficiency TR are known values, throttle valve opening degree $\theta_1$ necessary to realize the engine speed $N_1$ can be obtained from calculations. Fuel consumption rate $F_1$ at the throttle valve opening degree $\theta_1$ and the engine speed $N_1$ can also be obtained from calculations. As described above, the minimum fuel consumption line can be obtained by first obtaining the throttle valve opening degree $\theta_1$ and the fuel consumption rate $F_1$, assuming that the change ratio is at the lower limit change ratio $\gamma_1$. As described above, fuel consumption will increase, since the resistance increases, when the change ratio is reduced in the vicinity of the lower limit change ratio $\gamma_1$. Therefore, it can be considered that fuel consumption rate F can be reduced by increasing the change ratio in calculations. According to this embodiment, the change ratio $\gamma$ is defined to be the ratio of the secondary pulley revolution speed $N_S$ with respect to the engine speed in accordance with Equation (1). Therefore, the fact that the change ratio is calculated as to increase, that is, the fact that the change ratio is increased by $\Delta\gamma$ means that engine speed $N_s$ is increased by $\Delta N$ according to the following relationships:

$$\gamma_2 = \gamma_1 + \Delta\gamma = \frac{N_2}{N_S} \quad (4)$$

Since the increase in the change ratio $\gamma$ will reduce the resistance on the pulley, the fuel consumption rate F is, as shown in FIG. 10, decreased from $F_1$ to $F_2$. When the previously described operation, in which the engine speed is, from calculations, raised by $\Delta N$ and the fuel consumption rate F is calculated, is repeated, the result becomes as follows:

when engine speed NE is raised as follows:

$$N_1 \rightarrow N_2 \rightarrow N_3 \rightarrow N_4 \rightarrow N_5$$

The throttle opening degree q changes as follows:

$$\theta_1 \rightarrow \theta_2 \rightarrow \theta_3 \rightarrow \theta_4 \rightarrow \theta_5$$

Therefore, the fuel consumption rate F is monotonously decreased as follows:

$$F_1 \rightarrow F_2 \rightarrow F_3 \rightarrow F_4 \rightarrow F_5$$

When the pulley resistance is reduced by raising the change ratio, the fuel consumption rate is increased due to a rise in engine speed. Therefore, the lowering of the fuel consumption rate due to an increase in the change ratio and the increase in the fuel consumption rate due to the rise in the engine speed balance with each other. When this operation, in which the change ratio is raised, is continued, the quantity of the increase in the fuel consumption rate due to the arise in the engine speed exceeds the quantity of the reduction in the fuel consumption rate due to the rise in the change ratio. That is, when the engine speed is changed from $N_5$ to $N_6$ by calculation, the fuel consumption rate F is increased from $F_5$ to $F_6$. That is, $F_5$ is the minimum fuel consumption rate with which the vehicle speed V can be achieved and the engine speed $N_5$ for obtaining the previously described fuel consumption rate $F_5$ is the engine speed with which the minimum fuel consumption rate can be obtained. Therefore, the change ratio for achieving the minimum fuel consumption at the vehicle speed V, that is, the minimum change ratio $\gamma^O\text{min}$ can be expressed as follows:

$$\gamma_5 = \frac{N_5}{N_S} \quad (5)$$

when the minimum change ratio which can be obtained by varying the vehicle speed are connected, the minimum fuel consumption line shown in FIG. 9 can be obtained.

The principle of obtaining the minimum change ratio $\gamma^O\text{min}$ at the vehicle speed V is as described above.

Since the previously described $\gamma^O\text{min}$ can be theoretically determined if the vehicle speed is determined, it can be prepared in the form of a map. However, since the resistance of the transmission of each vehicle varies every minute, $\gamma^O\text{min}$ cannot be previously arranged to be in the form of a map. Therefore, the control according to this embodiment is arranged in a manner such that the minimum change rate $\gamma^O$min is determined in a real time manner in accordance with the vehicle speed V at that time.

A control procedure for determining the minimum change rate $\gamma^O$min in accordance with the flow chart shown in FIG. 8 will now be described. The control procedure shown in FIG. 8 is arranged in a manner such that the operation is performed in parallel with the control procedure shown in FIG. 7 whereby the minimum change rate $\gamma^O$min at that time is determined. In step S10 shown in FIG. 7, the aiming change ratio obtained in step S6, in accordance with the minimum change rate $\gamma^O$min obtained by the control procedure shown in FIG. 8, is subjected to a limit correction process.

In steps S20 through S28 shown in FIG. 8, the theoretical fuel consumption rate $F_1$ with respect to the lower limit change ratio $\gamma_1$ ($=\gamma^M$min) is calculated. First, in step S20 shown in FIG. 8, the revolution $N_S$ of the second pulley is input so that the vehicle speed V is recognized. Assuming that the revolution of the secondary pulley which is necessary to obtain the vehicle speed V is $N_S$, the following relationship is held between $N_S$ and V:

$$V = k_1 \cdot N_S \tag{6}$$

where $k_1$ is a constant determined in accordance with the reduction rate in the reduction mechanism 5, the reduction rate in the differential mechanism 6, the radius of the wheel and the like.

In step S22, the output torque $TQ_{CNV}$ of the transmission mechanism 4 which is necessary to obtain the vehicle speed V is calculated in consideration of the running resistance of the vehicle.

In step S24, the theoretical engine speed $N_1$ necessary to obtain the vehicle speed V at the lower limit change ratio $\gamma_1$ is calculated.

$$N_1 = \gamma_1 \cdot N_S \tag{7}$$

In step S24, the corresponding throttle opening degree $\gamma_1$ is calculated in accordance with the output torque $TQ_{CNV}$ of the previously described transmission mechanism, the engine speed $N_1$, the lower limit change ratio $\gamma_1$ and the like. That is, transmission efficiency $TR_1$ of the transmission mechanism 4 at the lower limit change ratio $\gamma_1$ ($=0.447$) is obtained in accordance with the transmission efficiency map of the transmission mechanism shown in FIG. 1. As shown in FIG. 1, $TR_1$ is the minimum transmission efficiency with respect to $\gamma_1$. The transmission efficiency $TR_1$ is, as described with reference to FIG. 2, the quantity which is determined in consideration of the operation loss of the oil pump and the loss due to the dragging resistance of the clutch and the resistance at the time of the revolution of the pulley. When the output from the transmission mechanism 4 is $TQ_{CNV}$ at the time when the transmission efficiency of the transmission mechanism 4 is $TR_1$, the engine 1 must generate the following output:

$$\frac{TQ_{CNV}}{TR_1}$$

Then, throttle valve opening degree $\theta_1$ which is necessary to output the previously described engine torque is calculated.

The thus obtained throttle valve opening degree $\theta_1$ is the throttle opening degree which is necessary to generate the engine torque which is considered to be necessary to secure the present vehicle speed V assuming that the change ratio $\gamma$ is set to the minimum value $\gamma_1$.

If the engine speed $N_1$ and the throttle opening degree $\theta_1$ are determined in step S26, the fuel consumption rate $F_1$ is determined. In step S28, the fuel consumption rate $F_1$ for obtaining the vehicle speed V at the lower limit change ratio $\gamma_1$ is obtained in accordance with the engine speed $N_1$ and the throttle opening degree $\theta_1$.

In steps S30 through S42, the change ratio $\gamma$min, which is necessary when the minimum fuel consumption is obtained while starting from $N_1$, $F_1$ and $\gamma_1$, is determined. That is, in step S30, an estimated small engine speed $\Delta N$ is added to the engine speed $N_1$ so that engine speed $N_{n+1}$ ($n=1, 2, \ldots$) at the present control cycle is obtained. In step S32, the change ratio at that engine speed $N_{n+1}$ is calculated in accordance with the following equation:

$$\gamma_{n+1} = \frac{N_{n+1}}{N_S} \tag{8}$$

Next in step S34, the transmission efficiency $TR_{n+1}$ of the transmission mechanism 4, the necessary torque $TQ_{n+1}$, and the throttle valve opening degree $\theta_{n+1}$ at the previously described change ratio $\gamma_{n+1}$ are calculated by a process similar to that shown in step S26. In step S36, the fuel consumption ratio $F_{n+1}$ when the vehicle speed V corresponds to a change ratio $\gamma_{n+1}$ is obtained by a process similar to that shown in step S28.

In step S38, the minimum fuel consumption rate $F_{n+1}$ is detected. That is, the fuel consumption rate $F_n$ calculated in the previous control cycle and the fuel consumption rate calculated in the present control cycle are subjected to a comparison. If the result of the comparison is as follows:

$$F_n > F_{n+1}$$

the operational flow advances to step S42 in which the present fuel consumption rate becomes $F_{n+1}$ before the flow returns to step S30. Then, the fuel consumption rate $F_{n+1}$ at the change ratio $\gamma_{n+1}$ in the case where the engine speed is further raised by $\Delta N$ is obtained by repeating a process shown in FIG. 10 in which $F_2$ is obtained at $N_2$ and $F_3$ is obtained at $N_3, \ldots$ If the relationship $F_n \leq F_{n+1}$ is held in step S38, a determination is made in that the fuel consumption rate $F_n$ at that time is the minimum fuel consumption rate. Referring to FIG. 10, since $F_5 < F_6$, the fuel consumption rate $F_5$ at the engine speed $N_5$ is the desired minimum fuel consumption rate.

In step S40, a determination is made in that the change ratio $\gamma_n$ (the change ratio $\gamma_5$ at the engine speed $N_5$ shown in FIG. 10) with respect to the fuel consumption rate $F_n$, which has been previously calculated, is the lower limit change ratio $\gamma^O$min for the transmission mechanism 4.

According to the control procedure for correcting $\gamma^O$min shown in FIG. 8, the change ratio $\gamma^O$min is determined to be the lower limit of the change ratios for controlling the change ratio, the change ratio $\gamma^O$min being selected from the theoretical change ratios capable of obtaining the present vehicle speed V. Specifically, in an operation region in which the fuel consumption rate F is lower than the minimum value $F_5$ shown in FIG. 10, that is, in an operation region in which the efficiency of transmission efficiency TR of the transmission mechanism 4 is relatively low, the minimum change ratio of the transmission mechanism 4 is corrected to the side which is larger than the lower limit change ratio (=0.447). As a result, the fuel consumption rate is improved.

That is, in the case where control is performed in a manner such that the change ratio is reduced to a value which is smaller than the minimum change ratio $\gamma^O\text{min}$ on the minimum fuel consumption line, the transmission efficiency TR of the transmission mechanism 4 is deteriorates considerably as is shown in FIG. 1. Therefore, a fear arises in that the fuel consumption efficiency will deteriorate as is shown in FIG. 9. However, according to the lower limit change ratio control due to this embodiment, the lower limit change ratio $\gamma^O\text{min}$ is set to the change ratio on the lower limit fuel consumption line designated by a dashed line of FIG. 10. That is, referring to FIG. 6, in the operation region from vehicle speed $V_X$ to $V_Y$, the change ratio has been corrected to the dashed line which shows the change ratios which are larger than the lower limit change ratio (0.447). Therefore, deterioration of the transmission efficiency can be prevented, causing the fuel consumption rate to be at a minimum level. Consequently, the fuel consumption efficiency can be improved.

Modification

The above described embodiment of the present invention may be modified and still fall within the scope of the claims.

Although the transmission efficiency TR is, according to the previously described embodiment, estimated from the change ratio g in accordance with the map shown in FIG. 1, the transmission efficiency TR may be directly measured by using other means.

According to the previously described embodiment, the minimum change ratio of the transmission mechanism 4 is corrected to a value approaching the change ratio $\gamma^O\text{min}$ at which the fuel consumption rate at the vehicle speed V becomes as low as possible. The reason for this lies in that the previously described engine system is arranged to use a structure in which the throttle valve is operated in synchronization with the acceleration pedal. However, the present invention is not limited to the previously described mechanical type throttle valve. Therefore, another structure may be employed in a case of an engine arranged in a manner such that its throttle valve is electrically opened/closed, the structure being arranged in a manner such that the throttle valve opening degree is forcibly controlled to the degree which is necessary to obtain the engine speed at the minimum change ratio which has been corrected at the vehicle speed V.

According to the previously described embodiment, the change ratio is defined to be the revolution of the secondary pulley with respect to the engine speed. The reason for this lies in that the engine speed and the primary revolution are substantially the same since a lockup is performed in the transmission in the subject operation region. However, the present invention is not limited to the change ratio defined as described above. Assuming that the revolution of the primary pulley 41 is $N_P$ and that of the secondary pulley 42 is $N_S$, the present invention may be applied to a control apparatus wherein the change ratio of which is defined as follows:

$$g = \frac{N_P}{N_S}$$

The present invention is not limited to the above embodiments, and various changes and modifications can be made within the spirit and scope of the present invention. Therefore, to apprise the public of the scope of the present invention the following claims are made.

What is claimed is

1. An apparatus for controlling the change ratio for stepless transmission including a transmission mechanism having drive and follower pulleys the effective radii of which can be changed and a belt arranged between said drive and follower pulleys, the apparatus comprising:
    change ratio adjustment means for adjusting a change ratio between said drive pulley and said follow pulley between a fixed upper limit and a correctable lower limit;
    speed detection means for detecting revolution speed of said follower pulley or vehicle speed;
    estimation means for estimating the transmission efficiency of said transmission mechanism in accordance with the change ratio of the transmission mechanism;
    calculation means for calculating a minimum point of fuel consumption rate from a predetermined fuel consumption function which is of the revolution speed or the vehicle speed, the change ratio, the estimated transmission efficiency, and fuel consumption rate; and
    limit determining means for determining the value of the correctable lower limit to a value corresponding to the minimum point of fuel consumption rate on the basis of the predetermined fuel consumption function.

2. A control apparatus according to claim 1, wherein said transmission efficiency estimation means includes:
    means for detection a present change ratio; and
    means for estimating the transmission efficiency of said transmission mechanism in accordance with said present change ratio thus detected.

3. A control apparatus according to claim 1, wherein the value of said correctable lower limit of said change ratio corrected by said limit determining means becomes larger as vehicle speed becomes higher.

4. A control apparatus according to claim 1, further comprising:
    transmission efficiency calculation means for calculating the transmission efficiency of said transmission mechanism;
    comparison means for comparing the estimated transmission efficiency with a predetermined value;
    wherein said fuel consumption function has extreme points on function curves with respect to the values of the revolution speed or the vehicle speed, and
    wherein said transmission efficiency calculation means is arranged
        to calculate a fuel consumption rate, when said transmission efficiency is lower than said predetermined value, and to operate at the extreme point on the function curve corresponding to the detected revolution speed or the vehicle speed.

5. An apparatus for controlling the change ratio for a stepless transmission including a transmission mechanism having drive and follower rotating members the effective radii of which can be changed and a driving-force transmitting means arranged between said drive and follower rotating members, the apparatus comprising:

change ratio adjustment means for adjusting a change ratio between said drive rotating member and said follower rotating member between a fixed upper limit and a correctable lower limit;

speed detection means for detecting revolution speed of said follower rotating member or vehicle speed;

estimation means for estimating the transmission efficiency of said transmission mechanism in accordance with the change ratio of the transmission mechanism;

calculation means for calculating a minimum point of fuel consumption rate from a predetermined fuel consumption function which is of the revolution speed or the vehicle speed, the change ratio, the estimated transmission efficiency, and fuel consumption rate; and limit determining means for determining the value of the correctable lower limit to a value corresponding to the minimum point of fuel consumption rate on the basis of the fuel consumption function.

* * * * *

UNITED STATES PATENT AND TRADEMARK OFFICE
CERTIFICATE OF CORRECTION

PATENT NO. : 5,368,530

DATED : NOVEMBER 29, 1994

INVENTOR(S) : Hiroaki SANEMATSU, et al.

It is certified that error appears in the above-indentified patent and that said Letters Patent is hereby corrected as shown below:

Col. 2,     line 46, "chance" should be --change--;
              line 60, "shown from" should be --shown in FIG. 2 from--.

Col. 4,     line 60, "such is" should be --such that it is--.

Col. 6,     line 59, "FIGS. 4 and 4B," should be --FIGS. 4A and 4B,--;
              line 67, "FIGS. 4 and 4B," should be --FIGS. 4A and 4B,--.

Col. 8,     line 6, "pilot" should be --pitot--.

Col. 10,     line 5, "the drawing" should be deleted;
              line 60, "$\theta^T$" should be --$\gamma^T$--.

Col. 12,     line 5, "$N_S$" should be --$N_E$--;
              line 6, after "relationships:", insert Equation 3:

$$--N_2 = N_1 + \Delta N \ldots\ldots\ldots\ldots (3)--;$$

line 21, "q" should be --$\theta$--.

UNITED STATES PATENT AND TRADEMARK OFFICE
CERTIFICATE OF CORRECTION

PATENT NO. : 5,368,530
DATED : NOVEMBER 29, 1994
INVENTOR(S) : Hiroaki SANEMATSU It is certified that error appears in the above-indentified patent and that said Letters Patent is hereby corrected as shown below:

Col. 15,     line 19, "according" should be --due--;
                line 20, "due" should be --according--.

Signed and Sealed this

Twelfth Day of December, 1995

Attest:

BRUCE LEHMAN

Attesting Officer     Commissioner of Patents and Trademarks